(No Model.)
P. LAFLIN.
MECHANISM FOR OPERATING DOFFER COMBS OF CARDING ENGINES.
No. 258,656. Patented May 30, 1882.
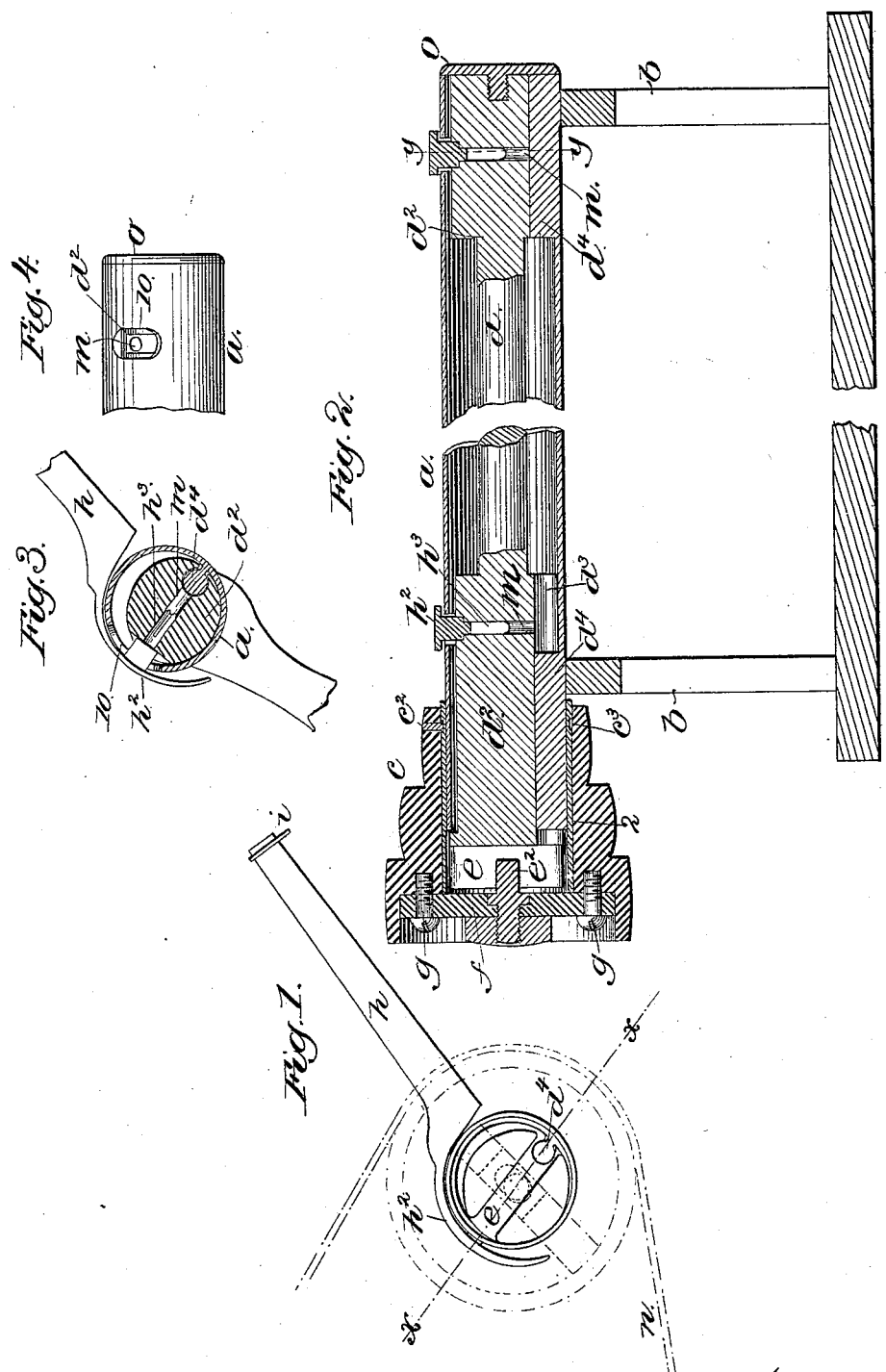
Witnesses.
Inventor:
Perley Laflin
by Crosby & Gregory
Attys.

UNITED STATES PATENT OFFICE.

PERLEY LAFLIN, OF WARREN, ASSIGNOR TO GEORGE DRAPER & SONS, OF HOPEDALE, MASSACHUSETTS.

MECHANISM FOR OPERATING DOFFER-COMBS OF CARDING-ENGINES.

SPECIFICATION forming part of Letters Patent No. 258,656, dated May 30, 1882.

Application filed February 23, 1882. (No model.)

*To all whom it may concern:*

Be it known that I, PERLEY LAFLIN, of Warren, county of Worcester, State of Massachusetts, have invented an Improvement in Mechanism for Operating Doffer-Combs of Carding-Engines, of which the following description, in connection with the accompanying drawings, is a specification.

In this my invention the comb rock-shaft contained in a fixed tube or sleeve is adapted to be rocked or vibrated on bearings at one side of the said rock-shaft, the said bearings being fixed preferably within the said sleeve, and at one end the said rock-shaft is provided with a slot that receives an eccentrically-located pin extended within it and connected with a revolving pulley, the axis of rotation of which is substantially coincident with the center of the said sleeve, so that as the said pulley is revolved the said pin carried by the pulley will cause the rock-shaft to be vibrated rapidly upon its bearings, such vibration of the comb rock-shaft causing the comb carried by suitable arms connected with the rock-shaft to operate with relation to the doffing-cylinder, as usual.

Figure 1 is an end elevation of a sufficient portion of the mechanism of a doffing-comb to illustrate my invention, the driving-pulley shown in Fig. 2 being represented in dotted lines or as transparent to show clearly the slot in the end of the comb rock-shaft. Fig. 2 is a longitudinal section on the line $x$ $x$, Fig. 1, the driving-pulley and its pin being, however, shown in full lines. In Fig. 2 the central part of the rock-shaft is shown in elevation, and it and the sleeve are broken out to save space upon the drawings. Fig. 3 is a section on the dotted line $yy$, Fig. 2, to show the manner of connecting the arms of the doffer-comb with the comb rock-shaft; and Fig. 4 is a detail, to be hereinafter referred to, showing the slot in the sleeve in which moves the screw or pin which connects the arms which carry the doffing-comb with the comb rock-shaft.

The sleeve or metal tube $a$ will be supported by suitable fixed bearings, $b$, forming part of the carding-machine, a portion only of the said bearings being, however, herein shown. Outside one of these bearings the sleeve or tube $a$ is provided with an enlarged cylindrical bearing, 2, which receives upon and about it loosely the rotating cone-pulley $c$, a suitable pin, $c^2$, entering a groove, $c^3$, in the said cylindrical bearing to prevent longitudinal motion of the pulley upon the said bearing.

The comb rock-shaft $d$ is enlarged at its outer end, as shown at $d^2$, to form hubs of sufficient size to prevent the rock-shaft moving far enough across the sleeve or tube diametrically to be removed from its bearing-pieces $d^4$ in the sleeve. These hubs are each grooved, as shown at $d^3$, to fit the ribs or bearing-pieces $d^4$, secured within the fixed sleeve $a$. These ribs $d^4$ are shown as nearly circular, and the grooves $d^3$ of the hubs $d^2$ are correspondingly shaped to fit them and permit the hubs and shaft to rock or vibrate within the tube $a$ about said bearings. Instead of these circular bearings, it is obvious that I might employ V-shaped ribs to fit V-shaped recesses in the hubs $d^2$.

One end of the comb rock-shaft $d$ is provided with a slot, $e$, in which is extended the pin $e^2$, which is connected with the head-plate $f$, attached by screws $g$ with and so as to form part of the cone-pulley $c$. The pin $e^2$ within the pulley $c$ and extended into the slot $e$ at the end of the comb rock-shaft is placed eccentrically to the axis of rotation of the pulley $c$, and during the rotation of the pulley $c$ the pin $e^2$ vibrates the comb rock-shaft about its bearings $d^4$, the extent of such vibration depending upon the degree of eccentricity of the said pin.

The arms $h$, which carry the doffer-comb $i$, of usual construction, have their rear ends, $h^2$, grooved and provided with pins $h^3$, which in the drawings are shown as split, so that when inserted in the holes $m$, made in the comb rock-shaft, the friction of the pins $h^3$ will hold said arms firmly. Instead of these split pins, however, I may attach the rear ends of the arms $h$ directly to the comb rock-shaft by means of screws or bolts, the said screws or bolts, as are the pins $h^3$, being extended through elongated slots 10, made in the sleeve or tube $a$, as shown in Fig. 4, such slots being necessary in order to permit the comb rock-shaft to be moved or vibrated on its bearing-points $d^4$, located at one side of its center and within the fixed sleeve or tube $a$.

The pulley $c$ will be driven by a suitable belt, $n$—such, for instance, as shown in dotted lines $n$—driven in any usual manner from any usual part of the carding-machine.

The comb rock-shaft is prevented from longitudinal motion in the sleeve $a$ in the direction of its length by means of a screw, $o$, herein shown as having a large head, the shank of the screw being inserted into a threaded hole at one end of the rock-shaft, while the head of the screw bears against one end of the sleeve $a$.

I claim—

1. The tubular fixed sleeve $a$ and its bearings $d^4$, and the comb rock-shaft supported upon the said bearings at one side of its center, and provided at its end with a slot, $e$, combined with a driving-pulley, $c$, having a pin mounted eccentrically thereon and entered directly within said slot, the rotation of the pulley causing its pin within the said slot to vibrate the rock-shaft, substantially as described.

2. The tubular fixed sleeve $a$ and the bearings $d^4$, the pulley $c$, mounted on said sleeve, and its eccentrically-placed pin $e^2$, combined with the comb rock-shaft supported at one side of its center by the bearings $d^4$, and provided at one end with a slot to be entered by the pin $e^2$, whereby by the rotation of the said pulley its stud or pin is caused to rock the rock-shaft, substantially as described.

3. The tubular fixed sleeve $a$, provided with slot 10, bearings $d^4$, and the cylindrical bearing 2 for the pulley, and the pulley $c$ and its eccentrically-placed pin $e^2$, and the comb rock-shaft $d$, sustained by the bearings $d^4$ at one side of its center, and provided with the slot $e$ to receive the said pin $e^2$, combined with the comb $i$ and its arms $h$, connected, substantially as described, with the comb rock-shaft, as and for the purpose set forth.

In testimony whereof I have signed my name to this specification in the presence of two subscribing witnesses.

PERLEY $\overset{\text{his}}{\times}$ LAFLIN.
mark.

Witnesses:
E. D. BANCROFT,
GEO. A. DRAPER.